(12) United States Patent
Farr (10) Patent No.: US 11,130,647 B2
(45) Date of Patent: Sep. 28, 2021

(54) EROSION CONTROL INSTALLATION FRAME AND METHOD

(71) Applicant: Farr Construction, LLC, Greer, SC (US)

(72) Inventor: Whitney Leonard Farr, Greer, SC (US)

( * ) Notice: Subject to any disclaimer, the term of this patent is extended or adjusted under 35 U.S.C. 154(b) by 0 days.

(21) Appl. No.: 16/931,834

(22) Filed: Jul. 17, 2020

(65) Prior Publication Data

US 2021/0032059 A1    Feb. 4, 2021

Related U.S. Application Data

(60) Provisional application No. 62/882,156, filed on Aug. 2, 2019.

(51) Int. Cl.
| | |
|---|---|
| *B65H 16/02* | (2006.01) |
| *E02D 17/20* | (2006.01) |
| *E02B 3/12* | (2006.01) |
| *B60P 3/035* | (2006.01) |

(52) U.S. Cl.
CPC ............ *B65H 16/028* (2013.01); *B60P 3/035* (2013.01); *E02B 3/122* (2013.01); *E02D 17/202* (2013.01)

(58) Field of Classification Search
CPC ...... E02D 17/202; E02B 3/122; B65H 16/028
USPC ................................ 405/302.4, 302.6, 302.7
See application file for complete search history.

(56) References Cited

U.S. PATENT DOCUMENTS

| | | | | | |
|---|---|---|---|---|---|
| 4,353,946 | A | * | 10/1982 | Bowers | E02D 17/20 405/15 |
| 6,244,846 | B1 | * | 6/2001 | Keller | B29C 63/36 118/254 |
| 7,018,135 | B2 | * | 3/2006 | Kaul | A01G 13/0287 405/129.75 |
| 2017/0239852 | A1 | * | 8/2017 | Motz | B09B 1/004 |

* cited by examiner

*Primary Examiner* — Sean D Andrish
(74) *Attorney, Agent, or Firm* — Shumaker, Loop & Kendrick, LLP (57) ABSTRACT

A frame for cradling a rolled surface covering during installation onto a ground surface, including first and second spaced-apart end panels, a surface covering support base extending between the first and second spaced-apart panels and adapted for holding the rolled surface covering during installation. At least one lower roller extends along the support base between the first and second spaced-apart end panels at a level above the support base, and at least one upper roller extends along the support base between the first and second spaced-apart end panels at a level above the support base and is vertically spaced-apart from the at least one lower roller. The space defines a gap extending along a length of the at least one lower roller and the at least one upper roller through which a free end of the rolled surface covering is extended during installation onto the ground surface.

3 Claims, 6 Drawing Sheets

EROSION CONTROL INSTALLATION FRAME AND METHOD

CROSS REFERENCE TO RELATED PATENT APPLICATIONS

This utility patent application claims priority from U.S. Provisional Application No. 62/882,156, filed Aug. 2, 2019, the contents of which are incorporated by reference in this application.

TECHNICAL FIELD AND BACKGROUND OF THE INVENTION

This invention relates to a frame for holding a roll of erosion control surface covering and method for installing erosion control surface coverings. Specifically this invention pertains to installation of erosion control surface coverings which are initially rolled or folded.

Controlling erosion of land is vital in a wide variety of applications. Many governmental entities have environmental and safety regulations pertaining to erosion control on land being developed. Conservation buffers are used to protect water and soil quality in agriculture applications such as farms. Water runoff and erosion control of sloped land is often necessary for protecting buildings and land during construction.

One of the primary and least expensive types of erosion control is surface coverings such blankets or mattings made of a range of natural and man-made materials. Often these products are sold in rolls. Typically the width of the roll necessitates using one roll multiple times up and down an incline to cover a space larger than the roll width. The end user is tasked with unrolling the surface covering in the desired location, cutting the covering and then bringing the roll back up the hill to unroll over another section. Unrolling these materials is often a manual, laborious task as these rolls can be large and heavy, requiring several individuals to manually unroll the material in coordination with each other.

Other less frequently used devices have been used, such as specifically designed vehicles that unroll as the vehicle moves, or attaching the rolled covering to a construction vehicle such as a tractor. However, these devices require that the rolled surface cover have a center core into which a rotatable axle can be inserted. Many commercial surface covering products do not have a center core and are incompatible with these unrolling devices.

There is a need for a frame for simplifying and reducing the labor needed to install surface coverings in roll form on a ground surface.

There is also a need for a frame for installing surface coverings in roll form which is relatively inexpensive, simple to use, and capable of accommodating surface covers in roll form with and without a center core.

SUMMARY OF THE INVENTION

It is therefore an object of the present invention to provide a frame for installing erosion control surface covering without a center core.

It is another object of the present invention to provide a frame for installing erosion control surface covering that is simple to use, inexpensive, effective and transportable. These and other objects and advantages of the present invention are achieved in the preferred embodiments set forth below by providing a frame for cradling a rolled surface covering during installation onto a ground surface, including first and second spaced-apart end panels, a surface covering support base extending between the first and second spaced-apart panels and adapted for holding the rolled surface covering during installation. At least one lower roller extends along the support base between the first and second spaced-apart end panels at a level above the support base, and at least one upper roller extends along the support base between the first and second spaced-apart end panels at a level above the support base and is vertically spaced-apart from the at least one lower roller. The space defines a gap extending along a length of the at least one lower roller and the at least one upper roller through which a free end of the rolled surface covering is extended during installation onto the ground surface.

According to one aspect of the invention, the support base comprises first and second laterally spaced-apart elongate support members extending along the length of the at least one lower roller and the at least one upper roller.

According to another aspect of the invention, the first and second elongate support members comprise cylindrical pipes.

According to another aspect of the invention, the at least one lower roller and the at least one upper roller each comprise cylindrical pipes.

According to another aspect of the invention, a frame for cradling a rolled surface covering is provided and includes first and second lower rollers positioned in laterally spaced-apart relation between the first and second spaced-apart end panels and first and second upper rollers positioned in laterally spaced-apart relation between the first and second spaced-apart end panels and above the first and second lower rollers to define respective first and second gaps through which the free end of the rolled surface covering is extended during installation onto the ground surface.

According to another aspect of the invention, the at least one lower roller and the at least one upper roller are mounted for rotation as the surface covering is pulled through the gap during installation.

According to another aspect of the invention, wheels supporting the frame are provided for rolling movement of the frame between surface covering installation locations.

According to another aspect of the invention, a frame is provided for cradling a rolled surface covering during installation onto a ground surface, and includes first and second spaced-apart end panels and a surface covering support base extending between the first and second spaced-apart panels and comprising first and second laterally spaced-apart elongate support members extending along the length of the frame and adapted for holding the rolled surface covering during installation. First and second lower cylindrical rollers are positioned in laterally spaced-apart relation between the first and second spaced-apart end panels and mounted for rotation as the surface covering is pulled through the gap during installation. First and second upper cylindrical rollers are mounted for rotation and positioned in laterally spaced-apart relation between the first and second spaced-apart end panels and above the first and second lower rollers to define respective first and second gaps through which the free end of the rolled surface covering is extended during installation onto the ground surface.

According to another aspect of the invention, a frame for cradling a rolled surface covering during installation onto a ground surface is provided and includes first and second spaced-apart end panels defining a frame length and first and second spaced-apart side beams connected to and extending between the first and second spaced-apart end panels. A base is positioned between and extending along the frame length of the first and second spaced-apart side beams and defining a support bed for a rolled surface covering to be installed from the frame. At least one lower roller extends along the support base between the first and second spaced-apart end panels at a level above the support base. At least one upper roller extends along the support base between the first and second spaced-apart end panels at a level above the support base and vertically spaced-apart from the at least one lower roller to define a gap extending along a length of the at least one lower roller and the at least one upper roller through which a free end of the rolled surface covering is extended during installation onto the ground surfaces. Wheels are connected to and support the frame proximate at least one of the end panels for rolling movement of the frame between surface covering installation locations.

According to another aspect of the invention, a post having a foot is connected to and supports an end of the frame opposite the wheels.

According to another aspect of the invention, a frame for cradling a rolled surface covering includes a handle mounted on an end of the frame to allow the frame to be manually maneuvered as needed According to another aspect of the invention, space adjustors are provided for adjusting the space between the lower and upper rollers to vary the width of the gap.

According to another aspect of the invention, the space adjustors are adapted to vary the width of the gap by varying the lateral spacing between the lower and upper rollers.

According to another aspect of the invention a method is provided for installing a rolled erosion protective surface covering onto a ground surface, and including the steps of providing a frame having two spaced-apart end panels, a base extending between the end panels and adapted to support the rolled surface covering, a least one lower roller connected to and extending between the end panels and positioned at a pre-determined distance above the base, at least one upper roller connected on each end to and extending between the end panels and positioned at a pre-determined distance above the lower roller to define a gap through which a free end of the surface covering is adapted to be positioned for installation onto a ground surface. A rolled erosion protective surface covering is positioned onto the base. The free end of the surface covering is extended through the gap defined by the lower roller and the upper roller. The rolled erosion protective surface covering is unrolled by pulling the free end of the rolled surface covering through the gap and depositing it on the ground surface.

According to another aspect of the invention, the space between the lower and upper rollers is varied to vary the width of the gap.

According to another aspect of the invention, the frame is supported on wheels to facilitate movement of the frame.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
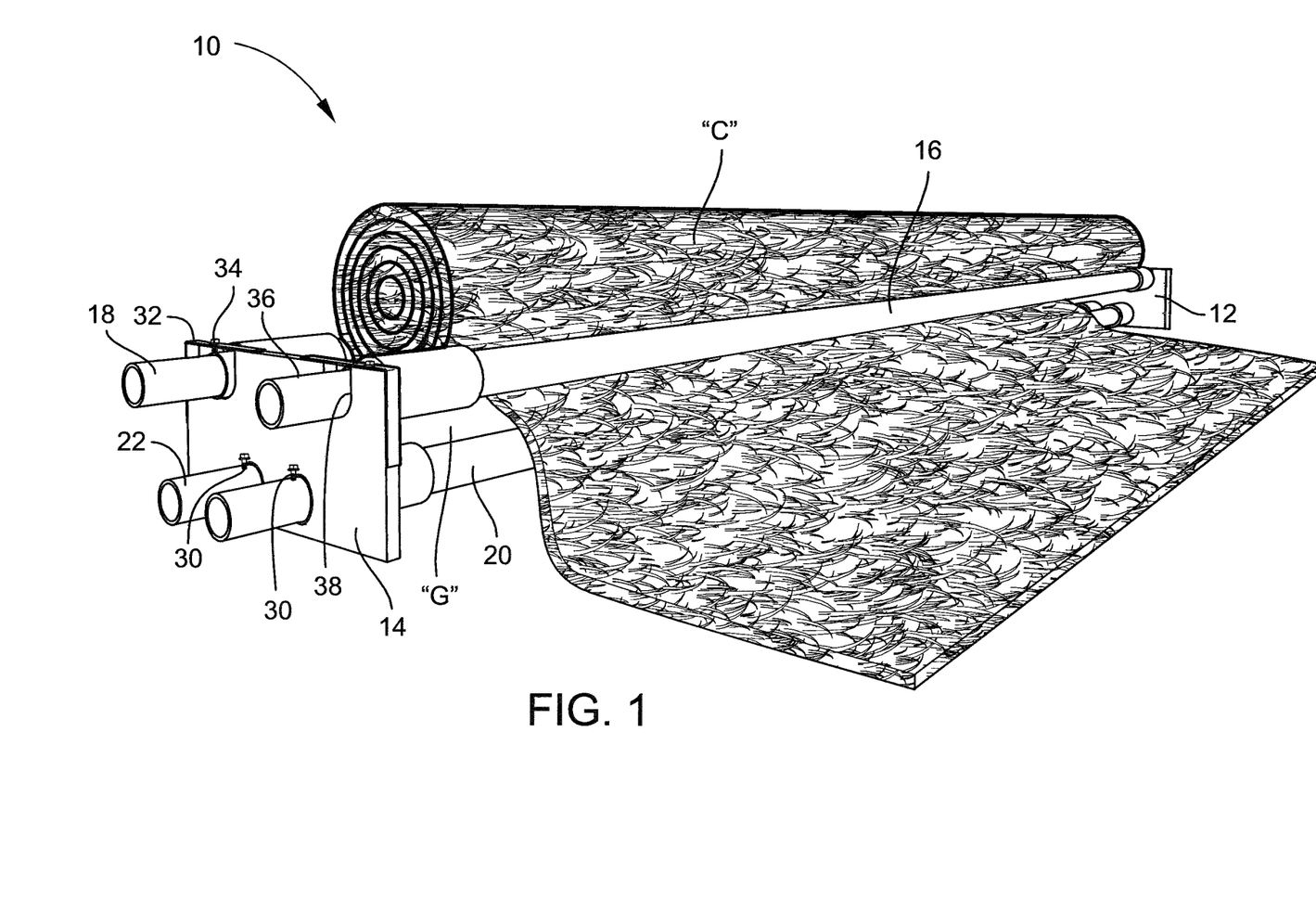
FIG. 1 is a perspective view of a frame for installing erosion control surface covers according to one embodiment of the invention, showing a roll of erosion control surface cover positioned in the frame.
Figure 2:
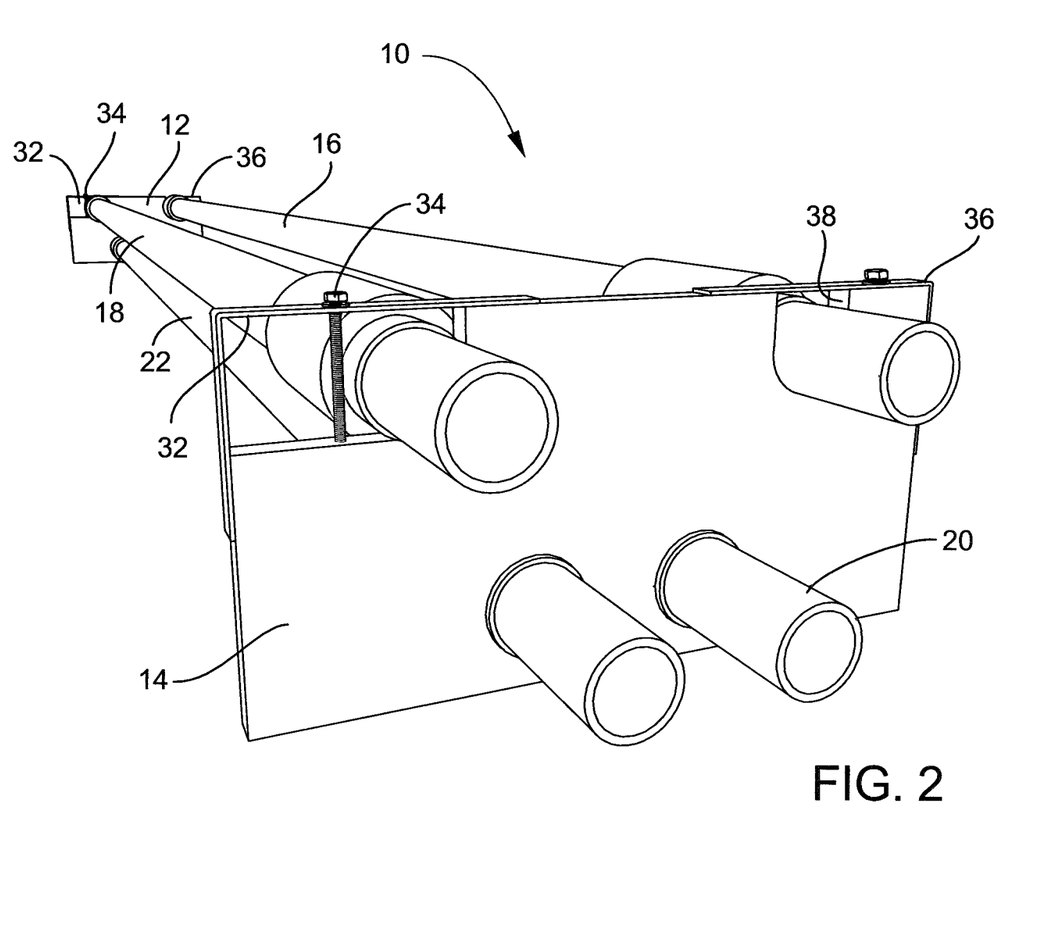
FIG. 2 is an end perspective view of the frame of FIG. 1.
Figure 3:
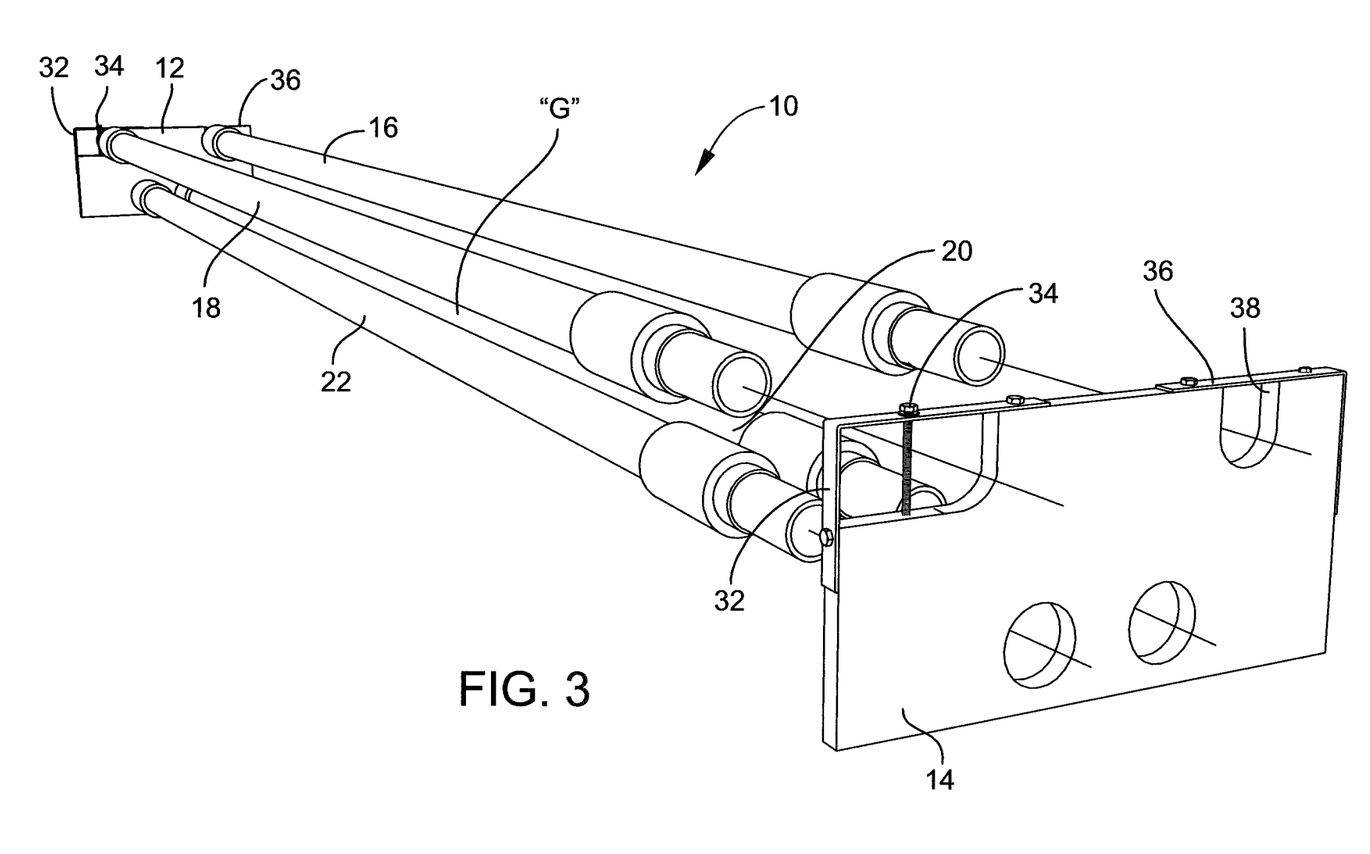
FIG. 3 is a view of the frame of FIG. 1 with parts broken away for clarity.

Referring now to FIGS. 1-3, a frame 10 for installing erosion control surface covers is shown. The frame 10 has two end panels 12, 14, upper rotatable rollers 16, 18, and two lower rotatable rollers 20, 22. The four rollers 16, 18, 20, 22 span the distance between end panels 12, 14 and cradle a rolled surface covering "C". The rollers 16, 18, 20 and 22 also define the length of the frame 10 and serve to unite the end panels 12, 14 into a single unit. The surface covering "C" is able to rotate and dispense the covering C when one end of the roll of surface covering "C" is drawn away from the frame 10. As shown in FIGS. 1 and 2, the surface covering "C" is fed between a gap "G" defined between the upper roller 16 and the lower roller 20, and through which the surface covering "C" passes. The frame 10 maintains a stationary position on the ground as the rolled surface covering "C" is applied to the ground by pulling it by its free end through the gap "G" between the rollers 16 and 20. Of course, the rolled surface covering "C" can be placed in the frame 10 with its free end extending in the opposite direction, in which case the free end of the surface covering "C" will be extended and fed through the gap "G" defined by the upper roller 18 and lower roller 22.

In the embodiment of FIGS. 1-3, the rollers 16, 18, 20, 22 are connected on opposing ends to the end panels 12, 14 through openings in the end panels 12, 14. In one preferred embodiment, the rollers 16, 18, 20, 22 are formed of PVC pipe with a diameter of, for example, 4 in (10 cm). Optionally, the portion of the rollers 16, 18, 20, 22 extending to the outside of the end panels 12, 14 are also PVC pipe and may have a diameter of 2 in (5 cm) which are connected together with cone adapters or other suitable fasteners. As shown in FIG. 3, bolts 30 pass through each roller 16, 18, 20, 22 outside of the end panels 12, 14 and lock the end panels 12, 14 and the rollers 16, 18, 20, 22 together in a unit.

The rollers 16, 18, 20, 22 may be constructed of other materials, for example other plastics, resins or metals. The rollers 16, 18, 20, 22 may be connected pieces of differing diameters or one molded piece having different diameters along the length. One or more of the rollers 16, 18, 20, 22 may be solid or hollow. One or more of the rollers 16, 18, 20, 22 may have a series of smaller rollers to improve the ability to unroll the rolled surface covering C. The rollers 16, 18, 20, 22 may be half rounded or crescent shaped. Lubricant may be applied to the openings or onto the rollers 16, 18, 20, 22 to decrease friction.

In other embodiments, the rotation of the rollers 16, 18, 20, 22 may be facilitated by use of ball bearing assemblies. In this configuration the rollers 16, 18, 20, 22 may include shafts free to rotate about corresponding bushings, not shown. Other suitable rotatable connections are within the scope of the invention.

The upper rollers 16, 18 are positioned with a pre-determined height and a pre-determined distance apart such that they prevent the rolled surface covering "C" from rolling up and out of the frame 10. The upper roller 16 also provides tension during unrolling of the rolled surface covering "C". In one example the ends of the upper rollers 16, 18 are 2 inch PVC pipes, are 13 in (33 cm) to 15 in (38 cm) apart and 9 in (23 cm) to 11 in (28 cm) above the base of the end frames 12, 14. A removable latch 36 may be positioned over a portion of the end panel 12, 14 opening for the upper roller 16. This latch 36 may be removed to insert the upper roller 16 once the rolled surface covering C has been placed into the frame 10. Upper roller 16 is captured in a U-shaped opening 38.

The upper roller 18 may be adjusted to reduce or increase the distance from the front roller 16 to accommodate surface coverings "C" having differing diameters. An "L" bracket 32 is positioned over a notch in the end panels 12, 14 and a bolt 34 may be removed to shift to make the adjustment and reinserted to secure the desired position. It is also envisioned that the upper roller 18 may have more than two adjustable positions and other suitable means by which to adjust. The upper roller 16 may also be adjustable in a similar or different suitable fashion. One or both of the front roller 16 and rear roller 18 may also be height adjustable in order to accommodate different sized surface coverings "C".

The two lower rollers 20, 22 are positioned below and between the upper rollers 16, 18. The rolled surface covering C is held out of contact with the ground and supported by the two lower rollers 20, 22. In one example the ends of the lower rollers 20, 22 are 2 in (5 cm) PVC pipes and have a 5 in (13 cm) distance between centers. The distance between the lower rollers 20, 22 may be different or adjustable, and the height may also be adjustable. It may also be desirable to have only one lower roller or more than two lower rollers. The lower rollers may be of the same or different diameters and may have different heights.

For additional rigidity to the frame 10, one or both lower rollers 20, 22 may be non-rotating. Upper rollers 16, 18 may also be stationary for rigidity purposes as well. Any of the rollers 16, 18, 20, 22 may be stationary by being permanently or detachably affixed to the end panels 12, 14. The rollers 16, 18, 20, 22 may also provide a user with the option of rotating or being stationary.

The rollers 16, 18, 20, 22 may be interchangeable with rollers of different lengths for different rolled surface covers "C", for example 8 ft. (2.4 m) and 16 ft. (4.9 m) versions. The rollers 16, 18, 20, 22 may also have length extender attachments or be telescoping.

The end panels 14, 16 may be made of wood, aluminum, or any other suitable material. The end panels 14, 16 may be flat plates or a series of supported and framed openings. Wheels may be attached to the bottom of the end plates to enable easy movement of the frame 10 once a heavy rolled surface covering 24 is cradled in the frame 10. These wheels may accommodate movement in multiple directions and may be detachable and/or lockable. Other convenience features such as stakes to prevent frame 10 movement during usage and handles for ease of movement are envisioned. The frame 10 may be a single joined unit or may be easily disassembled for transport and storage.

Operation of the frame 10 is designed to be simple and less labor to use as compared to manual installation of rolled surface covering "C".

Figure 4:
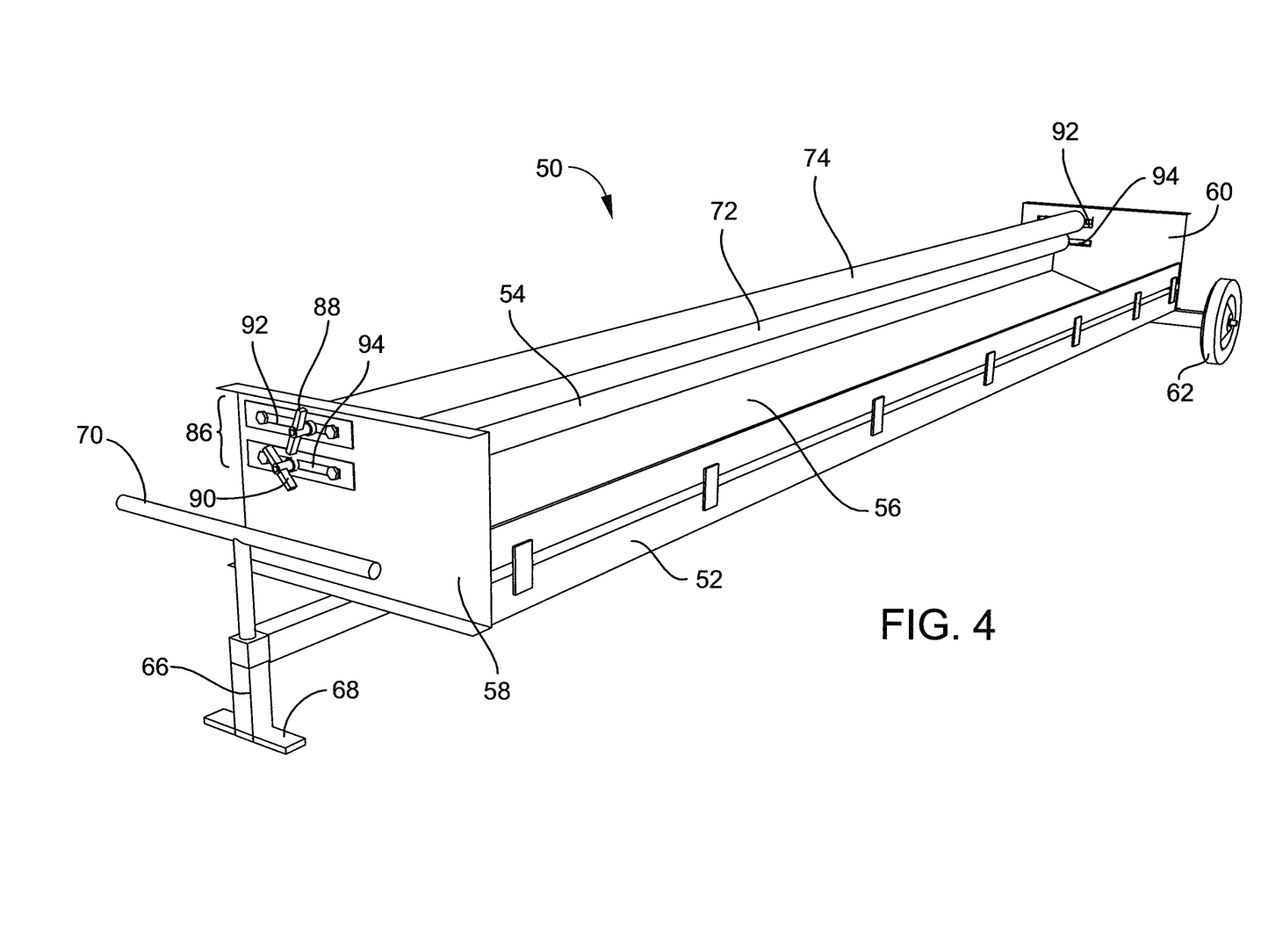
FIG. 4 is a perspective view of another embodiment of a frame for installing erosion control surface covers.
Figure 5:
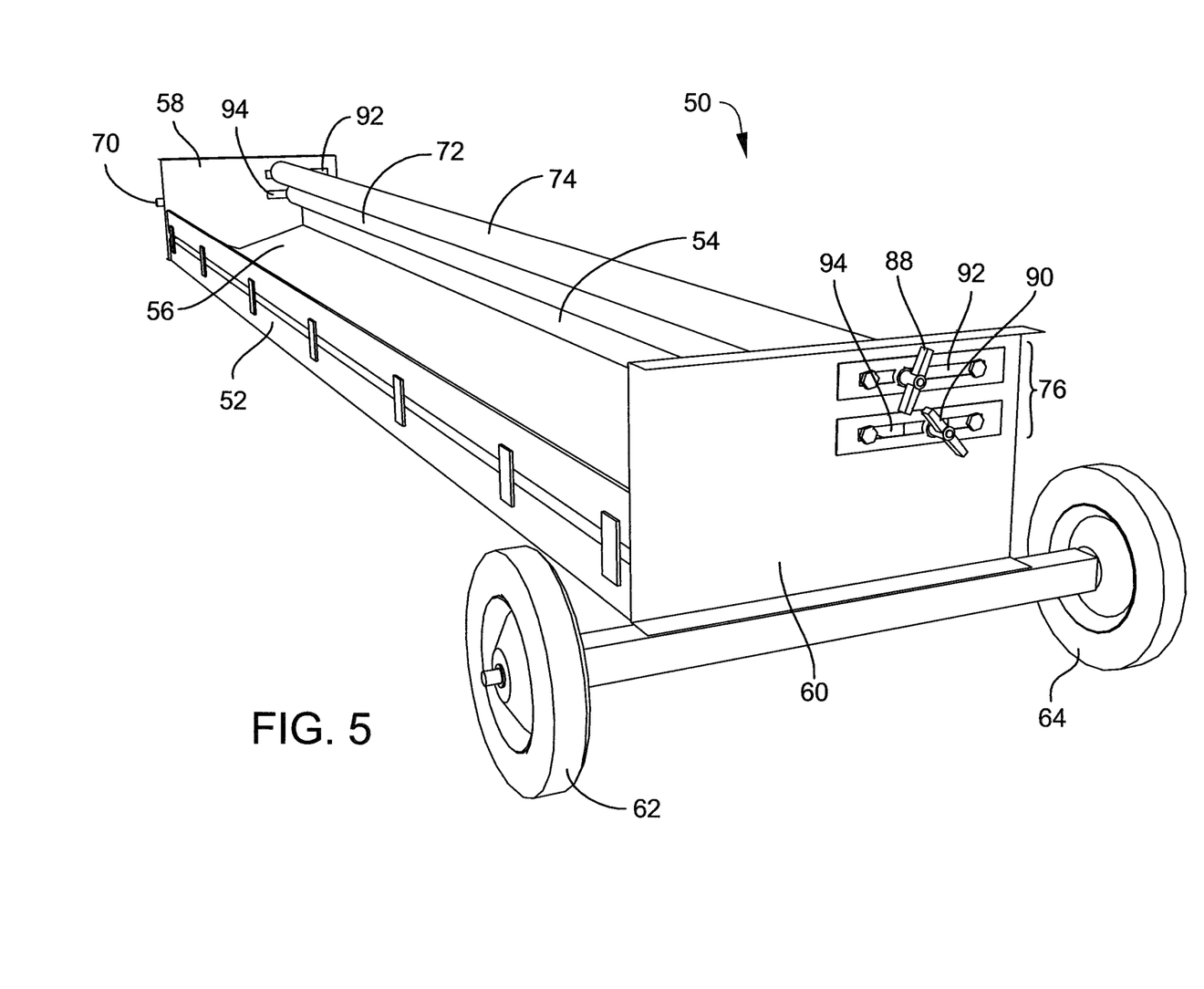
FIG. 5 is a perspective view of the frame of FIG. 4 as viewed from the opposite side and end from the view of FIG. 4.
Figure 6:
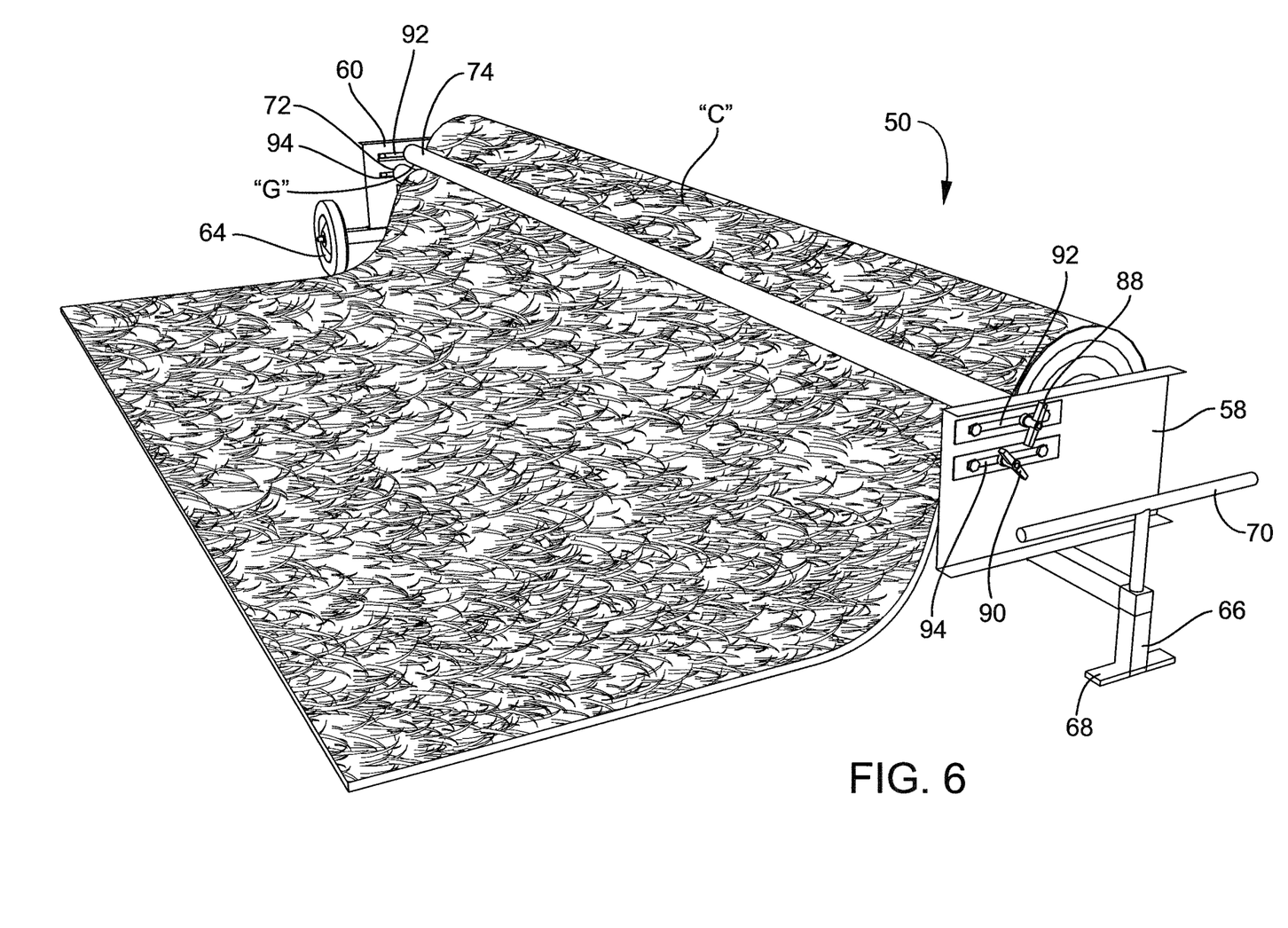
FIG. 6 is an end perspective view of the frame of FIG. 4, showing a roll of erosion control surface cover positioned in the frame.

Referring now to FIGS. 4-6, another embodiment of the frame for holding a roll of erosion control surface covering and method for installing erosion control surface coverings is shown and indicated broadly at reference numeral 50. This frame 50 is more in the nature of a trailer, and is fabricated of spaced-apart side beams 52, 54, a base 56 and end panels 58, 60 with suitable bracing to form a box supported on one end by wheels 62, 64 and on the opposite end by a post 66 having a foot 68. The beams 53, 54 may be angled inwardly towards the bottom to define a trough shape facilitating rolling movement of the surface covering "C". A tee-bar handle 70 is mounted on the post 66 and allows the frame 50 to be manually maneuvered as needed. The base 56 forms a support for the surface covering "C" against which the surface covering "C" rotates as it is dispensed.

A lower roller 72 and an upper roller 74 are mounted along one side of the frame 50, extending along the length of the frame 50 between the end panels 58 and 60. As best shown in FIGS. 5 and 7 the rollers 72 and 74 are vertically spaced-apart along their length and define a gap "G" through which a free end of a surface covering "C" is extended, and through which the surface covering "C" is dispensed, as is best shown in FIG. 4. The rollers 72 and 74 are secured by space adjustment brackets 76 and 86, shown in FIGS. 4 and 5, respectively. Explained with reference to space adjustment bracket 86 shown in FIG. 4, the rollers 72 and 74 are laterally adjustable by varying the position of adjustment handles 88 and 90. By loosening handle 88 the roller 74 may be shifted laterally, having the effect of increasing or decreasing the width of the gap "G" through which the surface covering "C" is passed. In a similar manner loosening the handle 90 permits the roller lower 72 to be shifted laterally, having the effect of increasing or decreasing the width of the gap "G". Either or both of the rollers 72, 74 may be adjusted in this manner in order to obtain optimum spacing for the thickness and surface friction of the surface covering "C" being used.

The space adjustment bracket 76 shown in FIG. 5 operates in the same manner as the space adjustment bracket 86 shown in FIG. 4 to vary the spacing of the lower and upper rollers 72 and 74 on the opposite end of the frame 50. Adjusting the width of the gap "G" by lateral movement of the lower and upper rollers 72 and 74 also permits the width of the opening between the upper roller 74 and the side beam 52 to be adjusted as needed to retain the surface covering "C" within the space defined by the side beam 52 and the upper roller 74. Various materials, lengths and dimensions of the frame 50 and its components may be used and are within the scope of the invention, as discussed above in relation to the frame 10 of FIGS. 1-3.

A frame for installing erosion protective surface coverings according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A method for installing a rolled erosion protective surface covering onto a ground surface while the frame is stationary, and including the steps of:
    a. providing a frame having two spaced-apart end panels, a base extending between the end panels and adapted to support the rolled surface covering, at least one lower roller connected to and extending between the end panels and positioned at a pre-determined distance above the base, at least one upper roller connected on each end to and extending between the end panels and positioned at a pre-determined distance above the at least one lower roller to define a gap through which a free end of the surface covering is adapted to be positioned for installation onto the ground surface;

b. positioning the rolled erosion protective surface covering onto the base;
c. extending the free end of the surface covering through the gap defined by the at least one lower roller and the at least one upper roller; and
d. unrolling the rolled erosion protective surface covering by pulling the free end of the rolled surface covering through the gap and depositing the surface covering on the ground surface.

2. The method according to claim 1, and including adjusting the lower and upper rollers to vary a width of the gap between the lower and upper rollers.

3. The method according to claim 1, and including supporting the frame on wheels to facilitate movement of the frame.

* * * * *